July 2, 1929. V. G. APPLE Re. 17,353

METHOD OF BUILDING ARMATURES

Original Filed Oct. 11, 1920 3 Sheets-Sheet 1

INVENTOR
Vincent G. Apple

July 2, 1929. V. G. APPLE Re. 17,353

METHOD OF BUILDING ARMATURES

Original Filed Oct. 11, 1920 3 Sheets-Sheet 2

INVENTOR
Vincent G. Apple

July 2, 1929. V. G. APPLE Re. 17,353

METHOD OF BUILDING ARMATURES

Original Filed Oct. 11, 1920 3 Sheets-Sheet 3

INVENTOR

Vincent G. Apple

Reissued July 2, 1929. Re. 17,353

UNITED STATES PATENT OFFICE.

VINCENT G. APPLE, OF DAYTON, OHIO.

REISSUED

METHOD OF BUILDING ARMATURES.

Original No. 1,555,931, dated October 6, 1925, Serial No. 416,307, filed October 11, 1920. Application for reissue filed July 12, 1927. Serial No. 205,259.

This invention relates to methods of building armatures and has especial reference to armatures of the bar wound type. The object of the invention is to provide a new and improved mode of procedure for applying conductor bars on the cores of dynamo electric machine elements.

I attain this object by the method illustrated in the accompanying drawing, wherein:—

Figure 1:
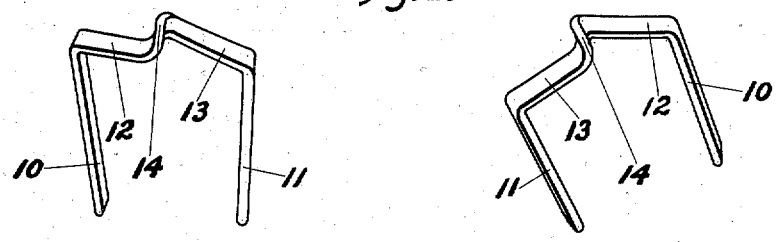
Figure 2:
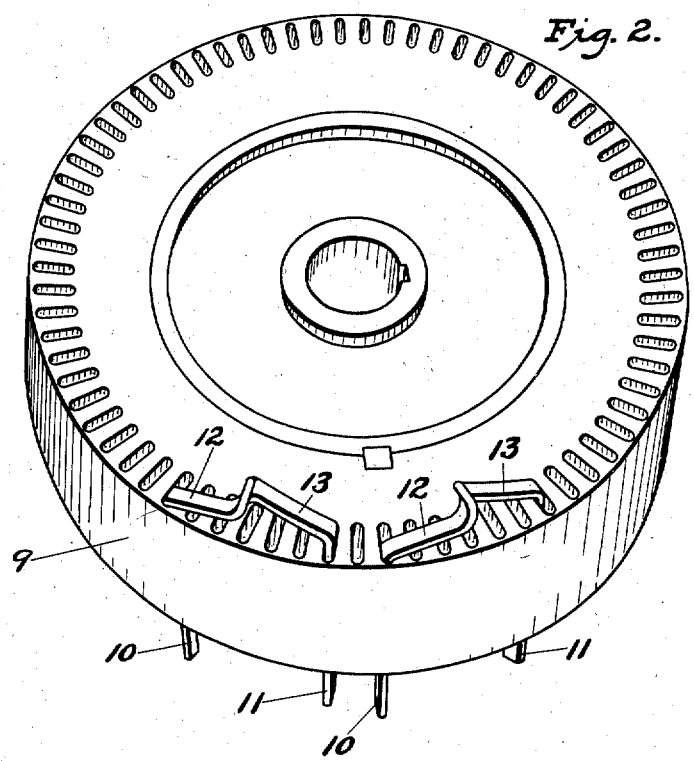
Figure 3:
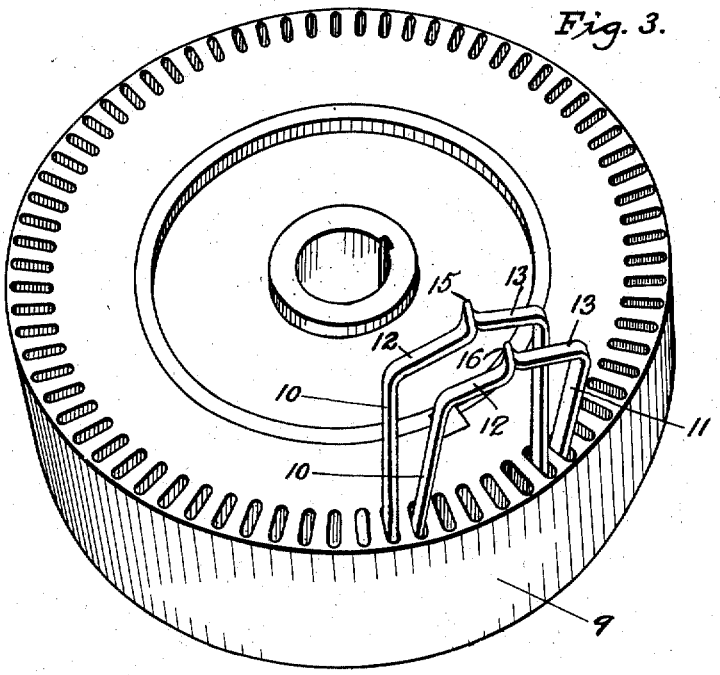
Figure 4:
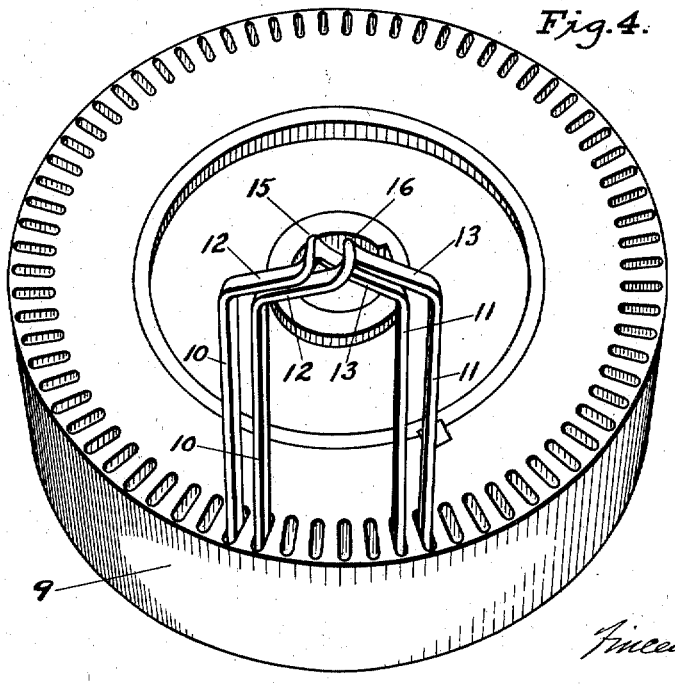
Figure 5:
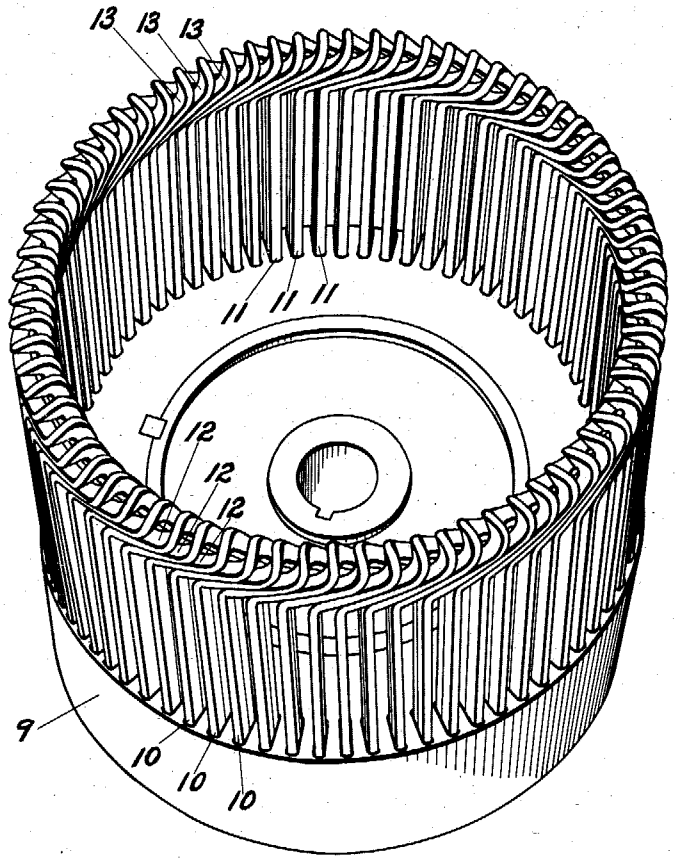
Figure 6:
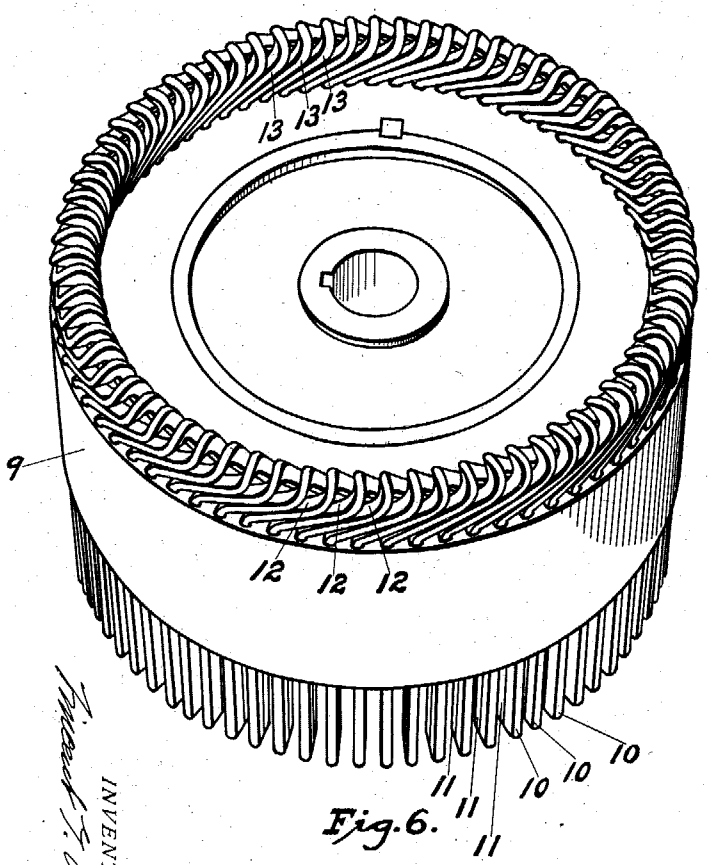

Fig. 1, shows, in perspective two of the winding loops;

Fig. 2, a core with two loops completely entered therein;

Fig. 3, a core with the first and second loops slightly entered;

Fig. 4, the core with first and second loops aligned ready for the insertion of the third;

Fig. 5, the core with all loops inserted and aligned, ready to press into place;

Fig. 6, the core after the loops have been endwise entered therein.

Similar numerals refer to similar parts thru out the several views.

The loops Figure 1 are such as are commonly employed in bar wound dynamo electric machine elements. Each comprises a bar 10, adapted to occupy the outer half of a winding aperture, a bar 11, adapted to occupy the inner half of a winding aperture, a yoke portion 12, proceeding at an angle from bar 10, and a yoke portion 13, proceeding at an angle from bar 11, the two yoke portions joining as at 14. When all the loops are in their final position in the core 9, the yoke portions 12 overlie the outer half of the winding apertures and the yoke portions 13 overlie the inner half of the winding apertures. (See Fig. 6).

When one or more, but less than the total required number of loops, are fully entered in the core apertures as shown in Figure 2, it will be seen that the yoke portions 12 overlie the outer half of several winding apertures, and yoke portions 13 overlie the inner half of several winding apertures, so that those bars which should eventually occupy the apertures so covered may not now be entered therein. It follows that, before proceeding to endwise enter a winding of the character shown into the apertures of the core, the entire number of the loops necessary to the complete winding must be placed in substantially that relation to each other which is required after endwise entry has been made, and that after they are so placed they may be simultaneously endwise entered into the core slots. My Patent #1,224,518, granted May 1st, 1917, broadly covers this method of making a dynamo machine element, and also contains several claims specific to a method whereby the entire required number of loops may be held in this necessary relation which permits of their endwise entry.

The present invention contemplates a simplified method of attaining the necessary arrangement of the loops for endwise entry into the core, without assembling them first into a template or other holding means and afterward having to transfer them to the core. By reference to Figure 5 it will appear that when a winding of the character herein employed is arranged in the necessary cylindrical formation required for endwise entry, each and every loop has its yoke portions 12 and 13 under corresponding yoke portions of adjacent loops. It follows that, in order to enter or remove a loop from such a formation, relative radial movement, between the yoke portions of the loop being entered or removed and those adjacent, must be effected. In a formation as appears in Fig. 5 an entire loop may not be radially displaced, since the ends of the loops are entered into the core apertures. It is therefore important that these ends must be slightly entered into the apertures, so that the yoke ends may be leaned toward or away from the core axis. In practice, a loop 15 is first entered as in Fig. 3, then followed by a loop 16, the yoke portion of the two loops being at variance as to radial position. The yokes of loops 15 and 16 are next brought together, by relative radial movement of the yokes with each other, to a position as shown in Fig. 4. Succeeding loops may then be inserted, advancing clockwise or counter clockwise as desired. If, after the first loop is entered, the procedure is clockwise around the core, the inserted loops are preferably leaned outwardly instead of inwardly, and the loops being inserted first leaned inwardly and then outwardly.

After the last loop is thus inserted the yokes are all brought to the radial position required in the final assembly which is substantially as shown in Fig. 5, then the loops are endwise entered by moving them axially into the core, or by moving the core axially onto the loops.

Since Patent No. 1,224,518, supra. covers broadly the method of "arranging loops in suitable formation and then simultaneously endwise entering them," and covers specifically the method of "arranging loops in suitable formation and supporting them temporarily in a template, then simultaneously endwise entering them," it is the purpose of the present application to cover specifically the method of "arranging the loops in suitable formation without a special means of retaining them in this formation other than the core itself, then simultaneously endwise entering them." This latter method is considered new and useful, therefore I claim:—

1. Steps in the method of making a dynamo electric machine element which consists in providing a core having a plurality of winding apertures; providing a plurality of winding loops of the character described; inserting the free ends of a loop into corresponding apertures of the core to such a limited extent as will permit limited radial movement of the yoke end of the loop; inserting the remaining loops to substantially the same extent as the first loop, always keeping the yoke ends of loops being inserted radially at variance with the yoke ends of adjacent inserted loops until the yoke portions of loops being inserted may enter under the corresponding yoke portions of said adjacent inserted loops; moving the yoke ends of the loops to their correct radial position; then simultaneously endwise entering the loops into the core.

2. Steps in the making of a dynamo electric machine element which consists in providing a core having a plurality of winding apertures; providing a plurality of winding loops of the character described; inserting the free ends of a loop into the corresponding apertures of the core to such a limited extent as will permit limited radial movement of the yoke end of the loop; leaning the yoke end of the loop so inserted away from the core axis; inserting succeeding loops by leaning the yoke ends first toward the core axis, until inserted to the proper depth, then leaning the yoke ends away from the core axis to bring the yoke end of a loop being inserted under a corresponding yoke end of the loop next previously inserted; straightening up the loops to bring the yoke ends to their correct radial position; then simultaneously endwise entering the loops into the core.

In testimony whereof I hereunto subscribe my name.

VINCENT G. APPLE.